US012762015B2

(12) United States Patent
Li et al.

(10) Patent No.: US 12,762,015 B2
(45) Date of Patent: Oct. 13, 2026

(54) EARLY USE OF RAIN IN READ ERROR HANDLING PROCESS

(71) Applicant: Micron Technology, Inc., Boise, ID (US)

(72) Inventors: Juane Li, Milpitas, CA (US); Wenchi Hong, Taichung City (TW)

(73) Assignee: Micron Technology, Inc., Boise, ID (US)

( * ) Notice: Subject to any disclaimer, the term of this patent is extended or adjusted under 35 U.S.C. 154(b) by 54 days.

(21) Appl. No.: 18/818,920

(22) Filed: Aug. 29, 2024

(65) Prior Publication Data

US 2026/0064532 A1 Mar. 5, 2026

(51) Int. Cl.
*G06F 11/10* (2006.01)

(52) U.S. Cl.
CPC ................................ *G06F 11/1076* (2013.01)

(58) Field of Classification Search
CPC .................................................. G06F 11/1076
See application file for complete search history.

(56) References Cited

U.S. PATENT DOCUMENTS 8,185,784 B2 * 5/2012 McCombs .......... G06F 11/2094 714/6.24
9,244,766 B2 * 1/2016 Patapoutian ........ G06F 11/1048
10,790,031 B1 9/2020 Sagdeo et al.
11,335,429 B1 * 5/2022 Hu ......................... G11C 29/52
11,630,720 B2 * 4/2023 Alavi .................. G06F 11/0727 714/15
2019/0278653 A1 9/2019 Padilla, Jr. et al.
2020/0365228 A1 11/2020 Cadloni et al.
2022/0115074 A1 * 4/2022 Teoh .................. G11C 16/0483
2022/0374305 A1 * 11/2022 Yeap ................... G06F 12/0246
2023/0393922 A1 12/2023 Ratnam et al.
2024/0403164 A1 * 12/2024 Tang .................. G06F 11/1441

FOREIGN PATENT DOCUMENTS

JP 2008192054 8/2008

OTHER PUBLICATIONS

"International Application Serial No. PCT US2025 041626, International Search Report mailed Dec. 11, 2025", 3 pages.
"International Application Serial No. PCT US2025 041626, Written Opinion mailed Dec. 11, 2025", 4 pages.

* cited by examiner

*Primary Examiner* — Bryce P Bonzo
*Assistant Examiner* — Xinyuan Yu
(74) *Attorney, Agent, or Firm* — Schwegman Lundberg & Woessner, P.A.

(57) ABSTRACT

Various example embodiments provide for early use of a redundant array of independent NAND-type memory devices-based (RAIN-based) error recovery technique in a read error handling (REH) process of a memory system to recover stored data. For some example embodiments, the RAIN-based error recovery technique is configured to determine, based on a system parameter, if and when the RAIN-based error recovery technique should be performed (e.g., triggered) at an alternative stage (e.g., at another position in the sequence) that is earlier than its current stage.

20 Claims, 4 Drawing Sheets

EARLY USE OF RAIN IN READ ERROR HANDLING PROCESS

TECHNICAL FIELD

Embodiments of the disclosure relate generally to memory devices and, more specifically, to early use of a redundant array of independent NAND-type memory devices-based (RAIN-based) error recovery technique in a read error handling (REH) process of a memory system to recover stored data.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various example embodiments of the disclosure. The drawings, however, should not be taken to limit the disclosure to the specific example embodiments, but are for explanation and understanding only.

DETAILED DESCRIPTION

Figure 1:
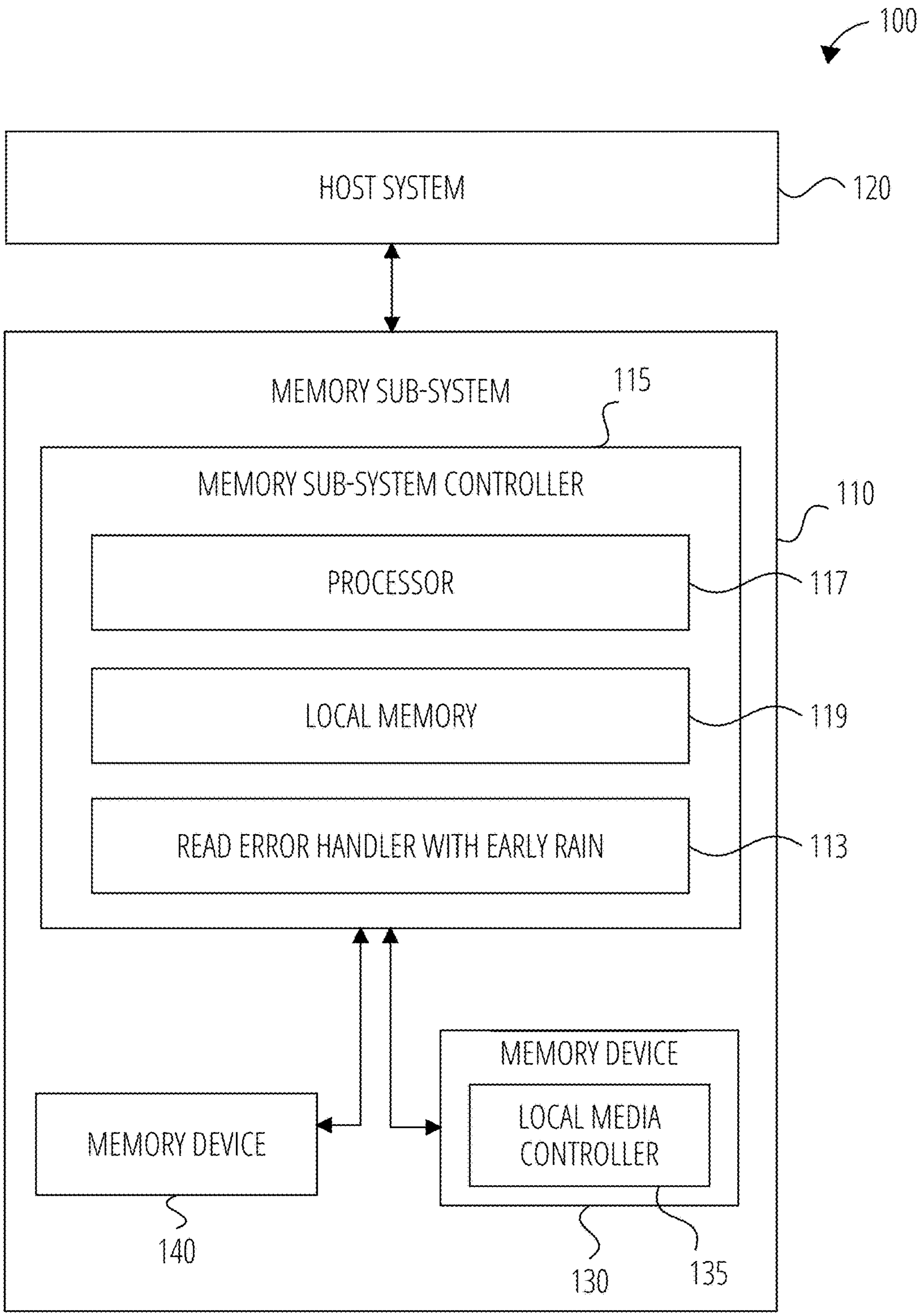
FIG. 1 is a block diagram illustrating an example computing system that includes a memory sub-system, in accordance with some example embodiments of the present disclosure.

Aspects of the present disclosure are directed to early use of a RAIN-based error recovery technique in a REH process of a memory system (e.g., memory sub-system) to recover stored data. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

Conventional memory sub-systems can employ error-correction techniques, such as using a RAIN technique, to protect data (e.g., host or user data) stored on the memory sub-systems. Error-correction techniques can comprise calculating parity (e.g., exclusive OR (XOR) parity) across some collection of data (e.g., host/user data) being error-protected. By such error-correction techniques, if a data member of the collection is lost (e.g., corrupted) for any reason, the parity calculation can be re-performed and the lost data recreated. With a RAIN technique (or RAIN protection scheme), data is striped (e.g., split) so that different portions of the data are stored across different pages or blocks of different memory die devices of one or more NAND-type memory devices. The pages or blocks of the different memory die that store the split data are collectively referred to as a stripe. When the split data is completely written across a given stripe of pages or blocks of a specified set of memory die of one or more NAND-type memory devices, the RAIN parity calculation is performed and stored in a parity page or block associated with the given stripe. An individual RAIN stripe can comprise the individual stripe (of pages or blocks) storing split data and the parity page or block for the individual stripe. In certain instances, a RAIN stripe comprises a single superblock.

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as an L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Generally, writing data to NAND-type memory devices involves programming (by way of a program operation) the NAND-type memory devices at the page level of a block, and erasing data from such memory devices involves erasing the memory devices at the block level (e.g., page level erasure of data is not possible). Certain memory devices, such as NAND-type memory devices, comprise one or more blocks, (e.g., multiple blocks) with each of those blocks comprising multiple pages, where each page comprises a subset of memory cells of the block, and where a single wordline of a block (which connects a group of memory cells of the block together) defines one or more pages of a block (depending on the type of memory cell). Depending on the embodiment, different blocks can comprise different types of memory cells. For instance, a block (a single-level cell (SLC) block) can comprise multiple SLCs, a block (a multi-level cell (MLC) block) can comprise multiple MLCs, a block (a triple-level cell (TLC) block) can comprise multiple TLCs, and a block (a quad-level cell (QLC) block) can comprise QLCs. Other blocks comprising other types of memory cells (e.g., higher-level memory cells, having higher bit storage-per-cell) are also possible.

Garbage collection (GC) operations are common to memory management of NAND-type memory devices and are important for maintaining the performance of the memory sub-systems that include one or more NAND-type memory devices. A GC operation usually involves the reclamation of blocks on one or more NAND-type memory devices that are no longer in use (e.g., storing invalid data) so that data can be written in those reclaimed blocks. Generally, a GC operation can comprise reading valid data from a block and rewriting it to a new block, and then erasing (now invalid) data stored in the old block so that the old block can be available for reuse in its entirety. The operation of reading valid data from a block (or a superblock) and rewriting it to a new block (or a new superblock) can be referred to as folding the block (or the superblock), and the valid data read by the folding operation can be referred to as data (of the block/superblock) to be folded. The efficiency of GC operation can directly impact write amplification on a NAND-type memory device and, as such, the lifespan and performance of the NAND-type memory device.

Although NAND-type memory devices permit write and read addressing at a page level and erasure addressing at a block level, there are some practical difficulties in such fine-grained resolution. These difficulties can include addressing overhead for a variety of tasks and operations, including maintenance of one or more tables that enable a flash translate layer (FTL) comprising a hardware/software layer in a controller of a memory sub-system that manages one or more operations on the memory sub-system. The FTL can, for example, perform logical-to-physical address translation, garbage collection, wear-leveling, error correction code (ECC), and bad block management.

To address these issues, blocks can be aggregated into a single logical entity or unit to which data is written, where each single logical entity/unit can be referred to as a logical superblock (hereafter, superblock). This arrangement provides some benefits, such as parallel execution of a write command across one or more memory circuit die (or memory die) or mitigating the impact of bad blocks on overall device performance. Superblocks can enable tracking fewer storage units, relieving pressure on FTL tables and management. This can be important in resource-limited memory sub-systems, where available working memory (e.g., random access memory (RAM) holding system state) can be limited. Using superblocks as a basic operational unit in the memory device can provide efficient resource management, while permitting more efficient maintenance operations (e.g., reduced latency and time to perform the operations) and effective device operation.

As used herein, a superblock comprises a plurality of blocks across one or more (e.g., all) of planes of one or more (e.g., all) memory die (e.g., NAND-type memory die) of a memory device. Each individual block of a superblock of a memory die can be associated with an index value (e.g., intra-die index value) that indicates a logical or physical position of the individual block within the individual block's respective plane of the memory die. A superblock can, for example, be formed by blocks in a same position across multiple planes (e.g., a same logical or physical position on each plane of multiple planes) of a single memory circuit die (or single memory die) or of multiple memory die (e.g., that form a memory array). Where a memory system implements a RAIN technique, an individual superblock can be formed by a single block from each of multiple planes of each of multiple memory die of a memory device.

While memory sub-systems, such as Solid-state drives (SSDs) have superior performance and reliability compared to traditional hard disk drives, they are not immune to failures, and efficient error handling and data recovery mechanisms are used to maintain performance and reliability. Conventional memory systems usually employ a multi-stage (or multi-step) read error handling (REH) process to recover data in the event of read failures.

A typical REH process comprises several read error recovery stages of increasing complexity and time consumption. These stages can comprise one or more initial read retries, one or more calibration processes, and one or more error correction techniques. For example, a REH process can perform the following stages in order until at least one of the stages is successful in addressing the read error: one or more read retries; one or more calibration processes, such as a coarse threshold estimate (CTE) calibration process, which can comprise a failed bit count (CFBit) calibration step; one or more error correction techniques, which can include a SureARC calibration process; one or more soft read operations; and one or more incremental soft read operations with corrective measures. Each of these stages aims to recover data with progressively more sophisticated methods but also incurs additional latency and computational overhead.

Read error recovery using a RAIN-based technique (hereafter referred as a RAIN-based error recovery technique) represents one of the most powerful but resource and time-consuming recovery methods available in memory systems. As described herein, a RAIN-based error recovery technique leverages redundancy across multiple memory die (e.g., NAND-type memory die) to reconstruct data that cannot be read directly from a given memory die (e.g., from a page or a block of the given memory die). Given its resource and time-consuming nature, a RAIN-based error recovery technique is usually positioned for use in conventional REH processes as one of the final stages to be used after several other stages have been attempted and failed to address a read error being handled.

While the approach of using a RAIN-based error recovery technique as one of the final stages of a REH process ensures that simpler, faster stages of the REH process are tried first, this approach can lead to significant latency in cases where the RAIN-based error recovery technique is ultimately needed to address the read error. This is particularly problematic in scenarios involving read error storms, where multiple read failures occur in rapid succession, such as when attempting to read from a defective block or a bad memory die. During an error storm event, a conventional REH process can result in memory system performance degradation or command timeouts, as each read failure can trigger a full sequence of error recovery stages (of the REH process) before eventually resorting to a RAIN-based error recovery technique, consuming valuable time and memory system resources. For example, a read error storm can occur while a folding operation is being performed on a block or a superblock, where the folding operation performs multiple read operations and a conventional REH process could result in each read operation going through several stages of REH process before reaching a RAIN-based error recovery technique to eventually recover the stored data (e.g., from the defective block or the bad memory die).

Various example embodiments described herein cure these and other deficiencies of conventional REH processes in a memory system. In particular, various example embodiments enable or otherwise facilitate early use of a RAIN-based error recovery technique in a REH process of a memory system to recover stored data. According to some example embodiments, a REH process of a memory system configured to perform a sequence of error recovery stages such that each error recovery stage is performed in sequential order until at least one error recovery stage successfully resolves the read error or all error recovery stages in the series have been attempted, where a RAIN-based error recovery technique is performed during a select stage in the sequence of error recovery stages. For some example embodiments, the RAIN-based error recovery technique is configured to determine, based on a system parameter, if and when the RAIN-based error recovery technique should be performed (e.g., triggered) at an alternative stage (e.g., at another position in the sequence) that is earlier than the select stage. By use of various embodiments, the thoroughness of error recovery by the REH process can be balanced with the need for rapid data access. Additionally, the use of various example embodiments can mitigate the performance degradation of a memory system caused by a REH process and can avoid any command timeouts caused by a REH process.

An example sequence of error recovery stages of a REH process is illustrated by TABLE 1 below (specifically at stage 7).

TABLE 1

| STAGE # | ERROR RECOVERY |
|---|---|
| 1 | Read options contains predefined NAND offsets |
| 2 | Read options contains system level offsets |
| 3 | System level calibration for known NAND degraded mode |
| 4 | NAND internal calibration (ARC) |
| 5 | Soft read from NAND (advanced ECC correction) |
| 6 | Soft read from NAND + cell-to-cell coupling calibration + cross-temperature compensation |
| 7 | RAIN-Based Error Recovery Technique |

An example sequence of error recovery stages of a REH process after the REH process determines to perform (e.g., triggered) earlier in the sequence of error recovery stages is illustrated by TABLE 2 below (specifically at stage 3).

TABLE 2

| STAGE # | ERROR RECOVERY |
|---|---|
| 1 | Read options contains predefined NAND offsets |
| 2 | Read options contains system level offsets |
| 3 | RAIN-Based Error Recovery Technique |
| 4 | System level calibration for known NAND degraded mode |
| 5 | NAND internal calibration (ARC) |
| 6 | Soft read from NAND (advanced ECC correction) |
| 7 | Soft read from NAND + cell-to-cell coupling calibration + cross-temperature compensation |
| 8 | System level calibration for known NAND degraded mode |

As used herein, a folding operation can comprise reading valid data from a block (or a superblock) and rewriting it to a new block (or a new superblock), and can be referred to as folding the block (or the superblock). The valid data read by a folding operation can be referred to as data (of the block/superblock) to be folded.

As used herein, a memory die that is bad (e.g., bad memory die) can also be referred to as a memory die that has failed (e.g., failed memory die).

Disclosed herein are some examples of early use of a RAIN-based error recovery technique in a REH process of a memory system (e.g., memory sub-system) to recover stored data, as described herein.

FIG. 1 illustrates an example computing system 100 that includes a memory sub-system 110, in accordance with some example embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. The computing system 100 can be used to support or implement various types of applications, including those relating to artificial intelligence (AI).

The computing system 100 can include a host system 120 that is coupled to one or more memory sub-systems 110. In some example embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, SLCs, can store one bit per cell. Other types of memory cells, such as MLCs, TLCs, QLCs, and penta-level cells (PLCs), can store multiple bits per cell. In some example embodiments, each of the memory devices 130, 140 can include one or more arrays of memory cells such as SLCs, MLCs, TLCs, QLCs, or any combination of such. In some example embodiments, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as an MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some example embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another example embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some example embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some example embodiments, the memory device 130 includes local media controller 135 that operates in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some example embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a read error handler 113 with early RAIN that enables or facilitates the memory sub-system controller 115 to early use of a RAIN-based error recovery technique in a REH process of the memory sub-system 110 to recover data stored on a memory device (e.g., 130, 140) of the memory sub-system 110 in accordance with various example embodiments described herein. Alternatively, some or all of the REH 113 is included by the local media controller 135, thereby enabling the local media controller 135 to enable or facilitate early use of a RAIN-based error recovery technique in a REH process of the memory sub-system 110.

Figure 2:
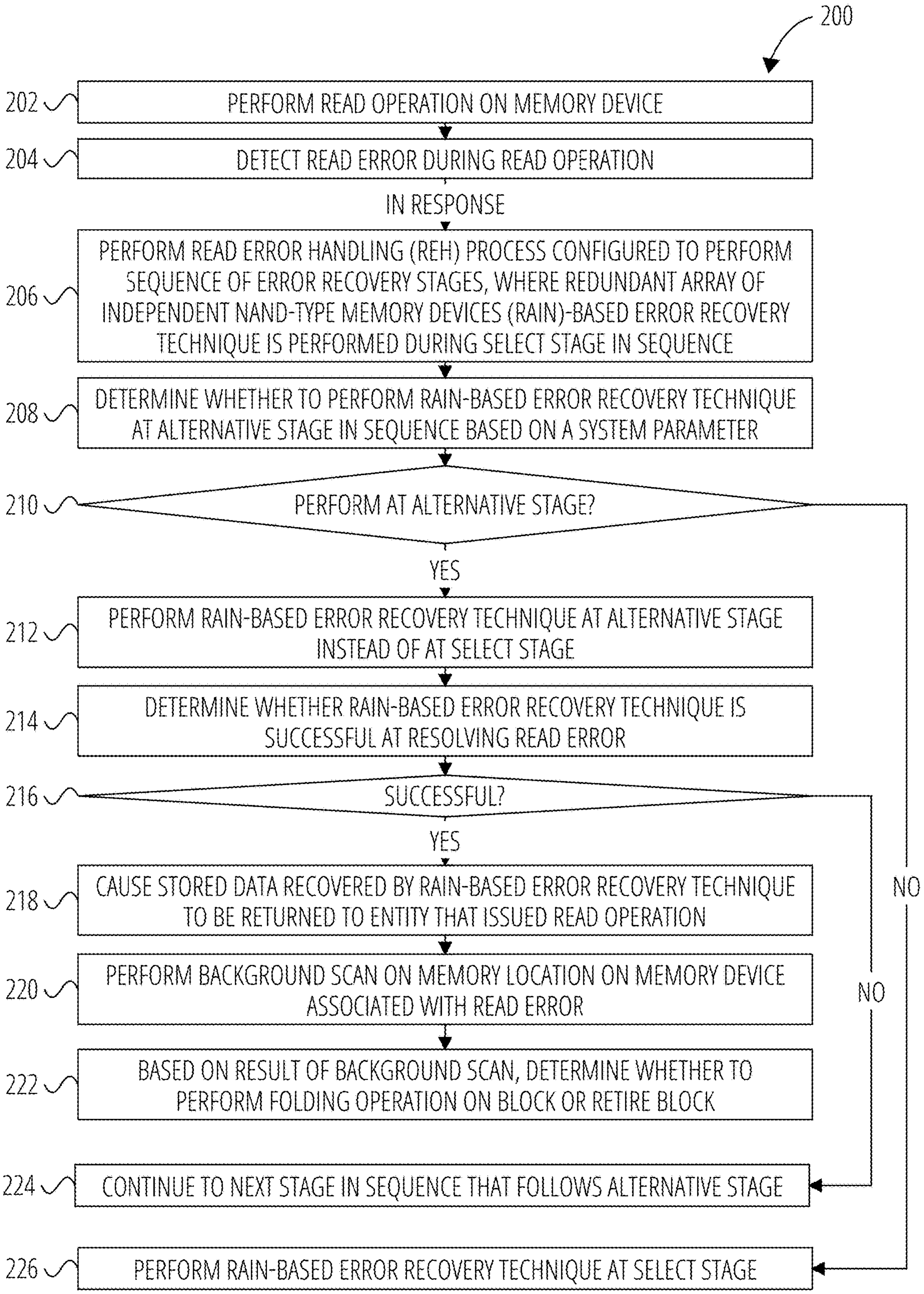
FIG. 2 and FIG. 3 are flow diagrams of example methods for a RAIN-based error recovery technique early in a REH process of a memory system to recover data stored on a memory device of a memory system, in accordance with some example embodiments of the present disclosure.
Figure 3:
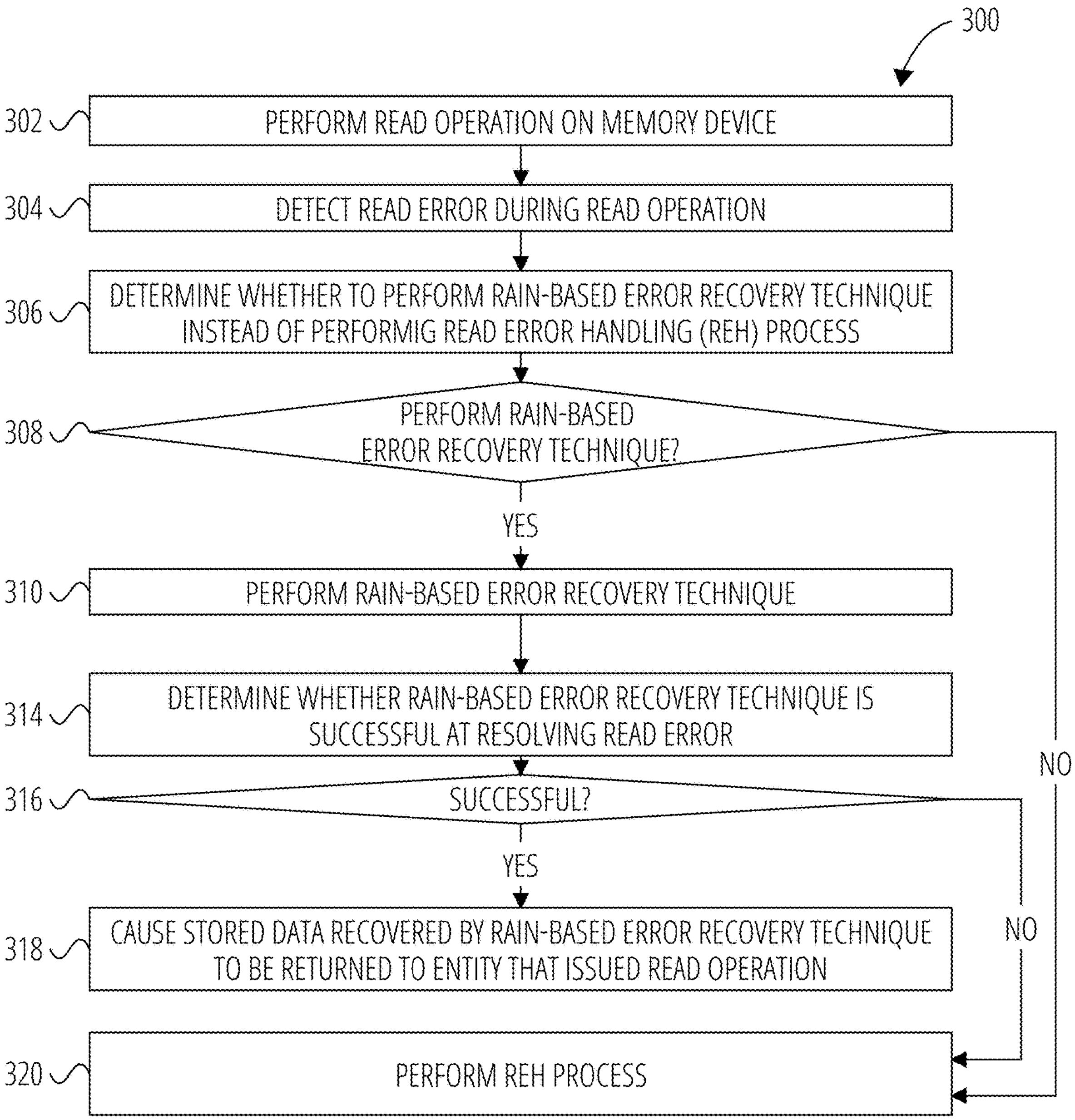

FIG. 2 and FIG. 3 are flow diagrams of example methods 200, 300 for using a RAIN-based error recovery technique early in a REH process of a memory system to recover data stored on a memory device of a memory system, in accordance with some example embodiments of the present disclosure. Any of methods 200, 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some example embodiments, either method 200 or method 300 is performed by the memory sub-system controller 115 of FIG. 1 based on the REH 113. Additionally, or alternatively, for some example embodiments, either method 200 or method 300 is performed, at least in part, by the local media controller 135 of the memory device 130 of FIG. 1. Although shown in a particular sequence or order, unless otherwise specified, the order of the processes can be modified. Thus, the illustrated example embodiments should be understood only as examples, and the illustrated processes can be performed in a different order, and some processes can be performed in parallel. Additionally, one or more processes can be omitted in various example embodiments. Thus, not all processes are used in every example embodiment. Other process flows are possible.

Referring now to method 200 of FIG. 2, at operation 204 a processing device (e.g., the processor 117 of the memory sub-system controller 115) performs a read operation on a memory device (e.g., 130, 140). For some example embodiments, the read operation is performed on a page at a memory location on the memory device or is performed on a block at a memory location on the memory device. The read operation can be performed on the memory device in response to a host command (e.g., host read command) received from a host system (e.g., the host system 120).

Subsequently, at operation 206, the processing device detects a read error during the read operation. In response to the read error, method 200 proceeds to operation 206, where the processing device performs (e.g., triggers) a REH process, which can handle the read error and attempt to recover the stored data the read operation was attempting to read. For various example embodiments, the REH process is configured to perform a sequence of error recovery stages such that each error recovery stage is performed in sequential order until at least one error recovery stage successfully resolves the read error or all error recovery stages in the series have been attempted. According to various example embodiments, the sequence of error recovery stages includes a RAIN-based error recovery technique that is performed (e.g., triggered) during a select stage (e.g., default, standard, or predetermined stage) in the sequence of error recovery stages.

Operations 208 through 226 can represent operations of REH process performed by the processing devices. At operation 208, the processing device determines whether to perform the RAIN-based error recovery technique at an alternative stage in the sequence of error recovery stages based on a system parameter, where the alternative stage is different from the select stage. According to various example embodiments, the alternative stage is earlier in the sequence of error recovery stages than the select stage. For instance, in the example of TABLE 1, the RAIN-based error recovery technique is to be performed at stage 7, which can represent the select stage. In the example of TABLE 2, the RAIN-based error recovery technique is to be performed at stage 3, which can represent the alternative stage. The system parameter can comprise a user-definable, user-configurable, or user-tunable parameter. A user can define, configure, or tune the system parameter using a user command (e.g., vendor-specific command). Additionally, a user can define, configure, or tune the system parameter based on one or more of: testing; statistical data regarding performance of the memory device; observed latencies of one or more error recovery stages of the REH process; and success/recovery rate of one or more error recovery stages of the REH process. Depending on the example embodiment, the alternative stage can be determined based on the system parameter, or can be a predetermined stage.

At decision block 210, in response to the processing device determining that the RAIN-based error recovery technique is to be performed at the alternative stage in the sequence of error recovery stages, method 200 proceeds to operation 212, where the processing device performs (e.g., triggers) the RAIN-based error recovery technique at the alternative stage instead of at the select stage. Alternatively, at decision block 210, in response to the processing device determining that the RAIN-based error recovery technique is not to be performed at the alternative stage in the sequence of error recovery stages, method 200 proceeds to operation 226, where the processing device performs (e.g., triggers) the RAIN-based error recovery technique at the select stage. Performing the RAIN-based error recovery technique at the performing alternative stage can represent performing early RAIN-based error recovery technique (e.g., performing the RAIN-based error recovery technique earlier in the REH process).

After operation 212 (e.g., when the RAIN-based error recovery technique concludes), at operation 214, the processing device determines whether the RAIN-based error recovery technique (performed at operation 212) is successful (e.g., recovery passed) at resolving the read error (e.g., recovering the stored data attempting to be read at operation 202). At decision block 216, in response to the processing device determining that the RAIN-based error recovery technique is not successful (e.g., recovery failed), method 200 proceeds to operation 224, where the processing device continues to a next stage in the sequence of error recovery stages that follows the alternative stage. However, at decision block 216, in response to the processing device determining that the RAIN-based error recovery technique is successful, method 200 proceeds to operation 218, the processing device causes stored data (e.g., the stored data attempting to be read at operation 202) recovered by the RAIN-based error recovery technique to be returned to an entity (e.g., read operation requester) that issued the read operation. For example, where the read command is performed in response to a host read command from a host system (e.g., 120), the stored data recovered can be returned to an entity that can return the stored data to the host system.

From operation 218, at operation 220, the processing device performs (e.g., triggers) a background scan on a memory location on the memory device, where the memory location is associated with the read error detected at operation 204. Subsequently, at operation 222, the processing device determines whether to perform a folding operation on a block associated with the memory location based on a result of the background scan, or determines whether to retire the block (e.g., mark the block as a bad block, such grown bad block (GBB)) associated with the memory location based on the result of the background scan. For example, if the background scan determines that the block remains good, the processing device can perform a folding operation on the block. As another example, if the background scan determines that the block is bad, the processing device marks the block as bad.

Referring now to FIG. 3, method 300 represents an alternative example of using a RAIN-based error recovery technique early in a REH process of a memory system to recover data stored on a memory device of a memory system. Operations 302 and 304 are respectively similar to operations 202 and 204 of method 200 illustrated and described with respect to FIG. 2.

At operation 306, the processing device determines whether to perform a RAIN-based error recovery technique instead of performing a REH process. Depending on the example embodiment, operation 306 comprises the processing device determining whether a block associated with the read error is bad, or a memory die associated with that block is bad. For example, to determine whether the block is bad, the processing device can determine whether an Uncorrectable ECC Error (UECC) counter value (that maintains a count of UECCs experienced by the block) associated with the block has reached (or surpassed) a UECC threshold value. In response to the UECC counter value reaching or surpassing the UECC threshold value, the processing device can determine to perform the RAIN-based error recovery technique instead of performing the REH process. However, in response to the UECC counter value not reaching or surpassing the UECC threshold value, the processing device can determine to not perform the RAIN-based error recovery technique instead of performing the REH process. The UECC threshold value can be a parameter value that can be derived and defined (e.g., by a user) based on memory device defect (e.g., NAND defect) data for the memory device. To determine whether a memory die associated with the block (that is associated with the read error) is bad, the processing device can determine whether the memory die has become non-responsive to commands issued to the memory die or that a UECC counter value (that maintains a count of UECCs experienced by the blocks of the memory die) surpasses a UECC threshold value associated with the memory die.

At decision block 308, in response to the processing device determining that the RAIN-based error recovery technique is to be performed instead of the REH process, method 300 proceeds to operation 310, where the processing device performs the RAIN-based error recovery technique. For some example embodiments, operation 310 is similar to operation 212 of method 200 illustrated and described with respect to FIG. 2. From operation 310, method 300 proceeds to operations 314, where operations 314 through 318 are respectively similar to operations 214 through 218 of method 200 illustrated and described with respect to FIG. 2.

At decision block 308, in response to the processing device determining that the RAIN-based error recovery technique is not to be performed instead of the REH process, method 300 proceeds to operation 320, where the processing device performs the REH process. The REH process performed can comprise multiple error recovery stages, which can include performing early RAIN-based error recovery technique based on a system parameter. Likewise, at decision block 316, in response to the processing device that the RAIN-based error recovery technique is not successful (e.g., recovery failed), method 300 proceeds to operation 320.

Figure 4:
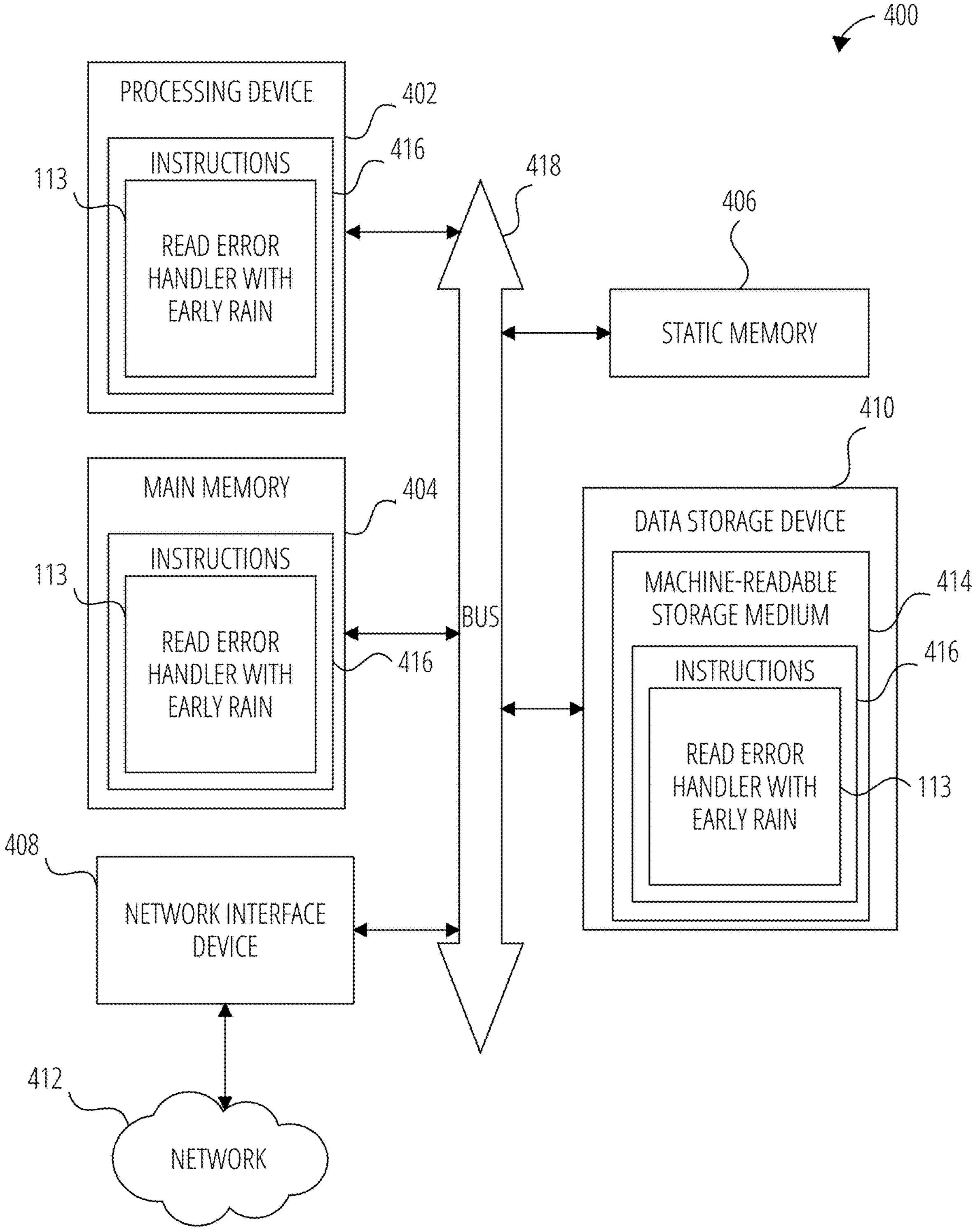
FIG. 4 is a block diagram of an example computer system in which example embodiments of the present disclosure may operate.

FIG. 4 illustrates an example machine in the form of a computer system 400 within which a set of instructions can be executed for causing the machine to perform any one or more of the methodologies discussed herein. In some example embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative example embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., ROM, flash memory, DRAM such as SDRAM or Rambus DRAM (RDRAM), etc.), a static memory 406 (e.g., flash memory, static random access memory (SRAM), etc.), and a data storage device 410, which communicate with each other via a bus 418.

The processing device 402 represents one or more general-purpose processing devices such as a microprocessor, a central processing unit, or the like. More particularly, the processing device 402 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 402 can also be one or more special-purpose processing devices such as an application-specific integrated circuit (ASIC), a field programmable gate array (FPGA), a digital signal processor (DSP), a network processor, or the like. The processing device 402 is configured to execute instructions 416 for performing the operations and steps discussed herein. The computer system 400 can further include a network interface device 408 to communicate over a network 412.

The data storage device 410 can include a machine-readable storage medium 414 (also known as a computer-readable medium) on which is stored one or more sets of instructions 416 or software embodying any one or more of the methodologies or functions described herein. The instructions 416 can also reside, completely or at least partially, within the main memory 404 and/or within the processing device 402 during execution thereof by the computer system 400, the main memory 404 and the processing device 402 also constituting machine-readable storage media. The machine-readable storage medium 414, data storage device 410, and/or main memory 404 can correspond to the memory sub-system 110 of FIG. 1.

In one example embodiment, the instructions 416 include instructions to implement functionality corresponding to early use of a RAIN-based error recovery technique in a REH process of a memory sub-system to recover stored data as described herein (e.g., the REH 113 of FIG. 1). While the machine-readable storage medium 414 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1 is a system comprising: a memory device comprising a plurality of NAND-type memory die, the plurality of NAND-type memory die storing data protected by redundant array of independent NAND-type memory devices (RAIN) parity information stored on the memory device; and a processing device, operatively coupled to the memory device, configured to perform operations comprising: detecting a read error during a read operation performed on the memory device; and in response to detecting the read error, performing a read error handling (REH) process configured to perform a sequence of error recovery stages such that each error recovery stage is performed in sequential order until at least one error recovery stage successfully resolves the read error or all error recovery stages in the sequence have been attempted, a RAIN-based error recovery technique is performed during a select stage in the sequence of error recovery stages, the performing of the REH process comprising: determining whether to perform the RAIN-based error recovery technique at an alternative stage in the sequence of error recovery stages based on a system parameter, the alternative stage being different from the select stage; and in response to determining that the RAIN-based error recovery technique is to be performed at the alternative stage in the sequence of error recovery stages, performing the RAIN-based error recovery technique at the alternative stage instead of at the select stage.

In Example 2, the subject matter of Example 1 includes, wherein the performing of the REH process comprises: in response to determining that the RAIN-based error recovery technique is to be performed at the alternative stage in the sequence of error recovery stages: determining whether the RAIN-based error recovery technique is successful at resolving the read error; and in response to determining that the RAIN-based error recovery technique is not successful, continuing to a next stage in the sequence of error recovery stages that follows the alternative stage.

In Example 3, the subject matter of Examples 1-2 includes, wherein the performing of the REH process comprises: in response to determining that the RAIN-based error recovery technique is to be performed at the alternative stage in the sequence of error recovery stages: determining whether the RAIN-based error recovery technique is successful at resolving the read error; and in response to determining that the RAIN-based error recovery technique is successful, causing stored data recovered by the RAIN-based error recovery technique to be returned to an entity that issued the read operation.

In Example 4, the subject matter of Example 3 includes, wherein the performing of the REH process comprises: in response to determining that the RAIN-based error recovery technique is successful, performing a background scan on a memory location on the memory device, the memory location being associated with the read error.

In Example 5, the subject matter of Example 4 includes, wherein the performing of the REH process comprises: based on a result of the background scan, determining whether to perform a folding operation on a block associated with the memory location.

In Example 6, the subject matter of Examples 4-5 includes, wherein the performing of the REH process comprises: based on a result of the background scan, determining whether to retire a block associated with the memory location.

In Example 7, the subject matter of Examples 1-6 includes, wherein the alternative stage is earlier in the sequence of error recovery stages than the select stage.

In Example 8, the subject matter of Examples 1-7 includes, wherein the alternative stage is determined based on the system parameter.

In Example 9, the subject matter of Examples 1-8 includes, wherein the alternative stage is a predetermined stage.

In Example 10, the subject matter of Examples 1-9 includes, wherein the system parameter is a user-defined parameter.

In Example 11, the subject matter of Examples 1-10 includes, wherein the read operation is being performed as part of a folding operation being performed on the memory device.

Example 12 is a method to implement any of Examples 1-11.

Example 13 is at least one machine-readable medium comprising instructions that, when executed by a processing device, cause the processing device to perform operations to implement any of Examples 1-11.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (such as a non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some example embodiments, a machine-readable (e.g., computer-readable) medium includes a machine (e.g., a computer) readable storage medium such as a ROM, RAM, magnetic disk storage media, optical storage media, flash memory components, and so forth. A machine-readable storage medium can be non-transitory (in other words, not having any transitory signals) in that it does not embody a propagating signal. However, labeling a machine-readable storage medium "non-transitory" should not be construed to mean that the machine-readable storage medium is incapable of movement; the machine-readable storage medium should be considered as being transportable from one physical location to another.

In the foregoing specification, example embodiments of the disclosure have been described with reference to specific example embodiments thereof. It will be evident that various modifications can be made thereto without departing from the broader spirit and scope of example embodiments of the disclosure as set forth in the following claims. The specification and drawings are, accordingly, to be regarded in an illustrative sense rather than a restrictive sense.

The invention claimed is:

1. A system comprising:

a memory device comprising a plurality of NAND-type memory die, the plurality of NAND-type memory die storing data protected by redundant array of independent NAND-type memory devices (RAIN) parity information stored on the memory device; and a processing device, operatively coupled to the memory device, configured to perform operations comprising:

detecting a read error during a read operation performed on the memory device; and in response to detecting the read error, performing a read error handling (REH) process configured to perform a sequence of error recovery stages such that each error recovery stage is performed in sequential order until at least one error recovery stage successfully resolves the read error or all error recovery stages in the sequence have been attempted, a RAIN-based error recovery technique is performed during a select stage in the sequence of error recovery stages, the performing of the REH process comprising:

determining whether to perform the RAIN-based error recovery technique at an alternative stage in the sequence of error recovery stages based on a system parameter, the alternative stage being different from the select stage; and in response to determining that the RAIN-based error recovery technique is to be performed at the alternative stage in the sequence of error recovery stages;

performing the RAIN-based error recovery technique at the alternative stage instead of at the select stage;

determining whether the RAIN-based error recovery technique is successful at resolving the read error; and in response to determining that the RAIN-based error recovery technique is not successful, continue to a next stage in the sequence of error recovery stages that follows the alternative stage.

2. The system of claim 1, wherein the performing of the REH process comprises:

in response to determining that the RAIN-based error recovery technique is to be performed at the alternative stage in the sequence of error recovery stages:

in response to determining that the RAIN-based error recovery technique is successful, causing stored data recovered by the RAIN-based error recovery technique to be returned to an entity that issued the read operation.

3. The system of claim 2, wherein the performing of the REH process comprises:

in response to determining that the RAIN-based error recovery technique is successful, performing a background scan on a memory location on the memory device, the memory location being associated with the read error.

4. The system of claim 3, wherein the performing of the REH process comprises:

based on a result of the background scan, determining whether to perform a folding operation on a block associated with the memory location.

5. The system of claim 3, wherein the performing of the REH process comprises:

based on a result of the background scan, determining whether to retire a block associated with the memory location.

6. The system of claim 1, wherein the alternative stage is earlier in the sequence of error recovery stages than the select stage.

7. The system of claim 1, wherein the alternative stage is determined based on the system parameter.

8. The system of claim 1, wherein the alternative stage is a predetermined stage.

9. The system of claim 1, wherein the system parameter is a user-defined parameter.

10. The system of claim 1, wherein the read operation is being performed as part of a folding operation being performed on the memory device.

11. At least one non-transitory machine-readable storage medium comprising instructions that, when executed by a processing device, cause the processing device to perform operations comprising:

detecting a read error during a read operation performed on a memory device, the memory device comprising a plurality of NAND-type memory die, the plurality of NAND-type memory die storing data protected by redundant array of independent NAND-type memory devices (RAIN) parity information stored on the memory device; and in response to detecting the read error, performing a read error handling (REH) process configured to perform a sequence of error recovery stages such that each error recovery stage is performed in sequential order until at least one error recovery stage successfully resolves the read error or all error recovery stages in the sequence have been attempted, a RAIN-based error recovery technique is performed during a select stage in the sequence of error recovery stages, the performing of the REH process comprising:

determining whether to perform the RAIN-based error recovery technique at an alternative stage in the sequence of error recovery stages based on a system parameter, the alternative stage being different from the select stage; and in response to determining that the RAIN-based error recovery technique is to be performed at the alternative stage in the sequence of error recovery stages;

performing the RAIN-based error recovery technique at the alternative stage instead of at the select stage;

determining whether the RAIN-based error recovery technique is successful at resolving the read error; and in response to determining that the RAIN-based error recovery technique is not successful, continuing to a next stage in the sequence of error recovery stages that follows the alternative stage.

12. The non-transitory machine-readable storage medium of claim 11, wherein the performing of the REH process comprises:

in response to determining that the RAIN-based error recovery technique is to be performed at the alternative stage in the sequence of error recovery stages:

in response to determining that the RAIN-based error recovery technique is successful, causing stored data recovered by the RAIN-based error recovery technique to be returned to an entity that issued the read operation.

13. The non-transitory machine-readable storage medium of claim 12, wherein the performing of the REH process comprises:

in response to determining that the RAIN-based error recovery technique is successful, performing a background scan on a memory location on the memory device, the memory location being associated with the read error.

14. The non-transitory machine-readable storage medium of claim 13, wherein the performing of the REH process comprises:

based on a result of the background scan, determining whether to perform a folding operation on a block associated with the memory location.

15. The non-transitory machine-readable storage medium of claim 13, wherein the performing of the REH process comprises:

based on a result of the background scan, determining whether to retire a block associated with the memory location.

16. The non-transitory machine-readable storage medium of claim 11, wherein the alternative stage is earlier in the sequence of error recovery stages than the select stage.

17. The non-transitory machine-readable storage medium of claim 11, wherein the alternative stage is determined based on the system parameter.

18. A method comprising:

detecting, by a processing device, a read error during a read operation performed on a memory device, the memory device comprising a plurality of NAND-type memory die, the plurality of NAND-type memory die storing data protected by redundant array of independent NAND-type memory devices (RAIN) parity information stored on the memory device; and in response to detecting the read error, performing, by the processing device, a read error handling (REH) process configured to perform a sequence of error recovery stages such that each error recovery stage is performed in sequential order until at least one error recovery stage successfully resolves the read error or all error recovery stages in the sequence have been attempted, a RAIN-based error recovery technique is performed during a select stage in the sequence of error recovery stages, the performing of the REH process comprising:

determining whether to perform the RAIN-based error recovery technique at an alternative stage in the sequence of error recovery stages based on a system parameter, the alternative stage being different from the select stage; and in response to determining that the RAIN-based error recovery technique is to be performed at the alternative stage in the sequence of error recovery stages;

performing the RAIN-based error recovery technique at the alternative stage instead of at the select stage;

determining whether the RAIN-based error recovery technique is successful at resolving the read error; and in response to determining that the RAIN-based error recovery technique is not successful, continuing to a next stage in the sequence of error recovery stages that follows the alternative stage.

19. The method of claim 18, wherein the performing of the REH process comprises:

in response to determining that the RAIN-based error recovery technique is to be performed at the alternative stage in the sequence of error recovery stages:

in response to determining that the RAIN-based error recovery technique is successful:

causing stored data recovered by the RAIN-based error recovery technique to be returned to an entity that issued the read operation; and performing a background scan on a memory location on the memory device, the memory location being associated with the read error.

20. The method of claim 19, wherein the performing of the REH process comprises:

based on a result of the background scan, determining whether to perform a folding operation on a block associated with the memory location.

* * * * *